United States Patent [19]

Swarup et al.

[11] Patent Number: 5,580,844
[45] Date of Patent: Dec. 3, 1996

[54] ENCAPSULATED BREAKER CHEMICAL

[75] Inventors: Vijay Swarup, Houston, Tex.; Dennis G. Peiffer, Annandale; Marty L. Gorbaty, Westfield, both of N.J.

[73] Assignee: Exxon Research and Engineering Company, Florham Park, N.J.

[21] Appl. No.: 250,219

[22] Filed: May 27, 1994

[51] Int. Cl.⁶ .............................. C08L 25/10; E21B 43/26
[52] U.S. Cl. ........................ 507/201; 507/219; 507/221; 507/232; 507/921; 428/402.24
[58] Field of Search .................................. 507/219, 221, 507/232, 201, 921

[56] References Cited

U.S. PATENT DOCUMENTS 4,514,308  4/1985  Clampitt et al. ..................... 252/8.5 C
5,110,486  5/1992  Manalastas et al. ................. 252/8.551

Primary Examiner—Sharon Gibson
Assistant Examiner—Catherine K. Scalzo
Attorney, Agent, or Firm—Joseph J. Dvorak

[57] ABSTRACT

According to the present invention, there is provided a coated breaker chemical in which the coating comprises a blend of a neutralized sulfonated ionomer and asphalt. Preferably, the coating contains from about 1 to 20 wt. % asphalt and from 99 to 80 wt. % of the neutralized sulfonated ionomer. In a particularly preferred embodiment of the present invention, the coating contains about 7 wt. % asphalt and about 93 wt. % of the neutralized sulfonated ionomer.

8 Claims, 1 Drawing Sheet

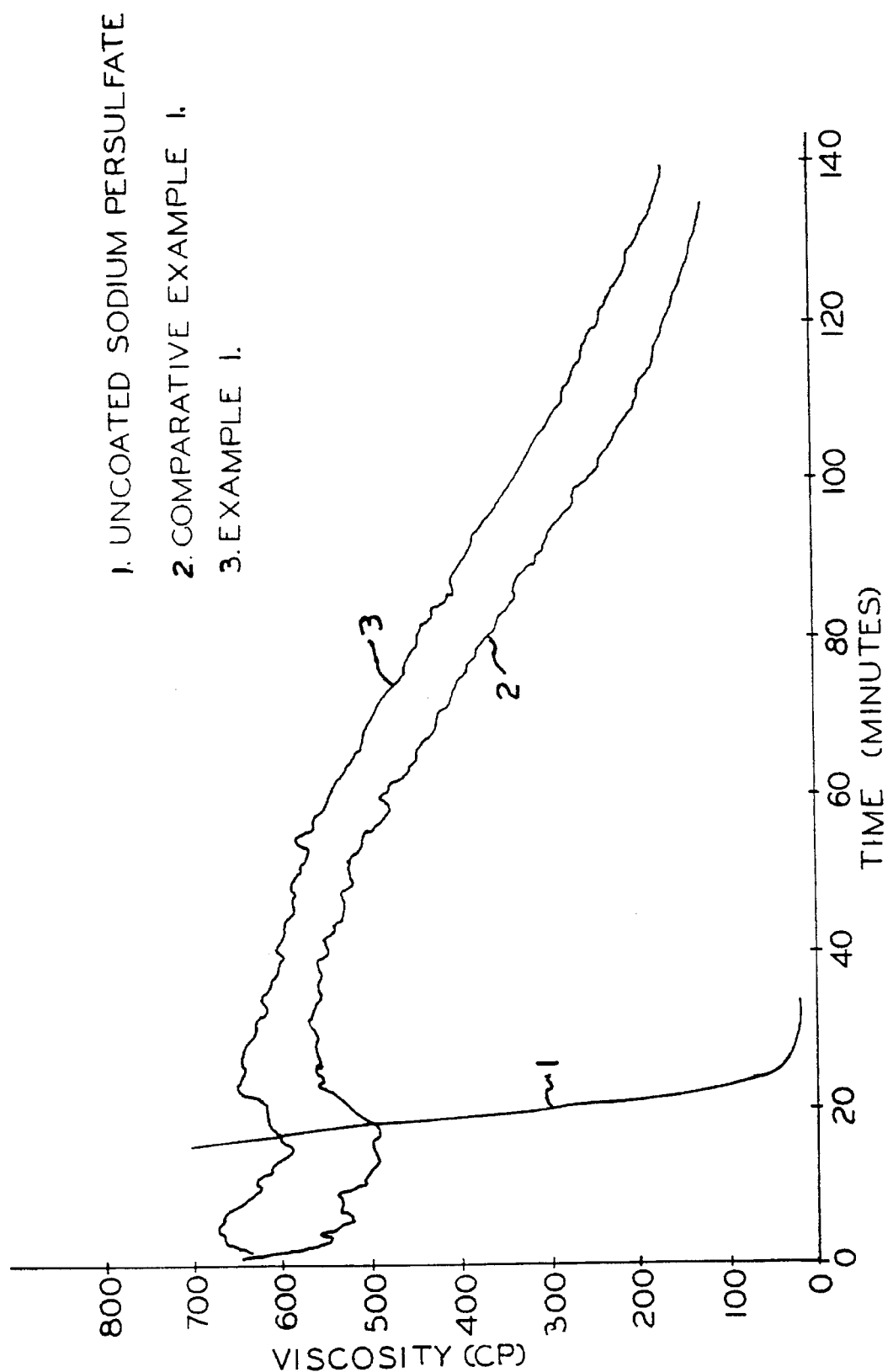

ENCAPSULATED BREAKER CHEMICAL

FIELD OF THE INVENTION

The present invention relates to encapsulated breaker chemicals used, for example, in forming and enlarging fractures in a subterranean formation in oil and gas well simulation operations.

DESCRIPTION OF THE PRIOR ART

Elastomeric sulfonated ionomers, such as sulfonated ethylene propylene diene (EPDM), terpolymers have been shown to be useful coating materials for breaker chemicals because of their water barrier properties, their elasticity and ability to be applied as thin continuous coatings substantially free of pinholes. In this regard, see, for example, U.S. Pat. No. 5,110,486, which discloses the use of sulfonated elastomers as coating materials for breaker chemicals.

Although elastomeric sulfonated EPDM materials have been successfully used for preparing encapsulated breaker chemicals, there remains a need to provide improved encapsulated breaker chemicals that are capable of releasing their chemical substrate over longer periods of time.

SUMMARY OF THE INVENTION

According to the present invention, there is provided a coated breaker chemical in which the coating comprises a blend of a neutralized sulfonated ionomer and asphalt. Preferably, the coating contains from about 1 to 20 wt. % asphalt and from 99 to 80 wt. % of the neutralized sulfonated ionomer. In a particularly preferred embodiment of the present invention, the coating contains about 7 wt. % asphalt and about 93 wt. % of the neutralized sulfonated ionomer.

BRIEF DESCRIPTION OF THE DRAWINGS

The Figure compares the ability of various breaker chemicals including the coated breaker chemical of this invention, to reduce the viscosity of a gelhol solution.

DETAILED DESCRIPTION OF THE INVENTION

The composite structure of the present invention includes a breaker chemical substrate such as ammonium persulfate, sodium persulfate, potassium persulfate, potassium monopersulfate, sodium chlorite, ammonium bifluoride, ammonium fluoride, sodium fluoride, potassium fluoride, sulfamic acid, citric acid, oxalic acid, ammonium sulfate, sodium acetate and enzymes and mixtures thereof. The composite of the present invention also includes a coating on the breaker chemical substrate which will provide for a controlled release of the breaker chemical substrate over a period of time under conditions of use, thereby achieving more efficient use of the breaker chemical.

In the composite of the present invention, the coating is a blend of a neutralized sulfonated ionomer and asphalt. Preferably, the ionomer is a neutralized sulfonated EPDM polymer containing from about 4 to about 200 meq. of pendant sulfonate groups per 100 grams of polymer and, more preferably, from about 10 to about 100 meq. of pendant sulfonate groups. These pendant sulfonate groups are neutralized with metal ions from Groups IA, IIA and IIB of the Periodic Table of the Elements, such as zinc, sodium, potassium and the like and ammonium counterions. The Periodic Table referred to is that shown on the inside cover of Lange's Handbook of Chemistry, 11th Edition, McGraw Hill Book Company, 1973. Neutralization is achieved, for example, by contacting the acid form of the polymer with an appropriate metal hydroxide, metal acetate, metal oxide or ammounium hydroxide.

The degree of neutralization of the sulfonate groups may vary widely, but generally will be greater than about 2 mole percent up to about 100 mole percent. It is particularly preferred, however, that the degree of neutralization be substantially complete; that is, with no free acid present.

The asphalt used in the practice of the present invention has a penetration number as determined by ASTM Test Method D-5 of from about 20 to 300 measured at 25° C. and, more preferably, from about 100 to 250 at 25° C. Optionally, the asphalt may be sulfonated and neutralized, as is the polymeric material, although it is not necessary to sulfonate and neutralize the asphalt. In those instances in which the asphalt is, in fact, sulfonated and neutralized, the sulfonation and neutralization can be achieved by techniques well known in the art, such as that disclosed in U.S. Pat. No. 4,514,308. In general, when using a sulfonated asphalt, the asphalt will contain from about 1 to about 100 meq. of sulfonate groups per 100 grams of asphalt and, more preferably, from about 5 to about 40 meq. of sulfonate groups. These pendant sulfonate groups may be neutralized with the same neutralizing agents as are set forth above in connection with the sulfonated polymer. The degree of neutralization of the sulfonated asphalt groups may vary widely, but generally will be greater than about 80 mole percent up to about 100 mole percent.

The ratio of neutralized sulfonated ionomer to asphalt in the composition of the present invention will generally be in the range of from about 99:1 to about 80:20 and, preferably, in the range of from about 97:3 to about 90:10.

The coatings of the present invention are formed by applying an organic solution of both the polymer and asphalt to the substrate at ambient temperatures or at temperatures in the range of about 10° C. to about 50° C. by either dip-coating, spraying or with the use of other techniques for thin spreading, such as brushing. The organic solvent system is then permitted to evaporate with or without the aid of forced drying gas, such as air or nitrogen. The drying gas temperature can be from ambient temperature up to the boiling point of the organic solvent system. Preferably, the temperature of the drying gas is between about 20° C. and about 100° C. The most preferred temperature for the drying gas should be about 50° C. for fast evaporation of the organic solvent system. After drying, the thickness of the applied coating should be about 1 micrometer to about 100 micrometers. Most preferred, the coating thickness should be about 2 to about 20 micrometers for both performance and economic reasons. This corresponds to a coating of 1 wt. % to about 4 wt. % based on the weight of composite.

To control the thickness of the applied coating, the solution concentration of the polymer asphalt blend applied is between 1.0 wt. % to 5 wt. %. Most preferably, the concentration should be about 2.5 wt. %.

Normally, the solvent used to form the organic solution will be a solvent such as toluene, xylene, hexane, preferably in combination with a polar solvent such as aliphatic alcohols having from 1 to 10 carbon atoms.

The following examples will demonstrate the performance of the polymer asphalt coating of the present invention.

Comparative Example 1

A 1.25 wt. % solution of the sodium salt of sulfonated EPDM was made in a 97/3 toluene-methanol mixture. The solution was sprayed on sodium persulfate in a fluid bed (bed temperature was 50° C.). A 3 wt. % coating was applied to the sodium persulfate.

Example 1

A solution consisting of the sodium salt of sulfonated EPDM and asphalt in the weight ratio of 92.5 to 7.5 was prepared by first dissolving the sulfonated EPDM in a toluene-methanol mixture (97/3) and then adding the asphalt to the mixture and allowing the solution to stir for one hour. The resulting solution was then sprayed on sodium persulfate in a fluid bed in order to obtain a 3 wt. % coating.

The effects of the coated breaker chemical of this Example 1 on reducing the viscosity of a gelled solution was measured over time as outlined below. For comparative purposes the test was also conducted once with uncoated breaker chemical and once with the coated breaker chemical of Comparative Example 1.

The data were generated as follows:

(1) A viscous gel was made by adding 21.77 kilograms of hydroxy propyl quar to 3785 liters of 2 wt. % KCl solution. The Ph was adjusted to 7 to 7.25 with HCl. A titanium metal salt was added at about 1 wt. % to crosslink the gel.

(2) Fluid viscosities were measured over time with a Faun 50° C. viscometics at 170 sec-1 (100 rpm) shear and at 71.11° C.

The results are shown in the Figure.

What is claimed is:

1. An encapsulated breaker chemical composite comprising:
   (a) a breaker chemical; and
   (b) a coating on the surface of the breaker chemical, the coating being a blend of a neutralized sulfonated ionomer and an asphalt, the ratio of sulfonated ionomer to asphalt being in the range of about 99:1 to 80:20, the coating having a thickness of from about 1 micrometer to about 100 micrometers.

2. The composite of claim 1 wherein the ionomer is an EPDM terpolymer.

3. The composite of claim 2 wherein the ratio of ionomer to asphalt is in the range of 97:3 to about 90:10.

4. The composite of claim 2 wherein the asphalt is sulfonated and neutralized.

5. The composite of claim 2 wherein the coating on the substrate is in the range of 1 wt. % to 4 wt. %.

6. An encapsulated breaker chemical composite comprising:
   (a) a breaker chemical selected from the group consisting of ammonium persulfate, sodium persulfate, potassium persulfate, potassium monopersulfate, sodium chlorite, ammonium bifluoride ammonium fluoride, sodium fluoride, potassium fluoride, sulfuric acid, citric acid, oxalic acid, ammonium sulfate, sodium acetate and enzymes and mixtures thereof, and
   (b) a coating on the surface of the breaker chemical, the coating consisting essentially of a blend of neutralized sulfonated ionomer and an asphalt having a penetration number of 20 to 300, the sulfonated ionomer having about 4 to about 200 meq. of pendant sulfonate groups per 100 grams of ionomers the ratio of ionomer and asphalt being in the range of 99:1 to 80:20, the coating being present in an amount in the range of 1 wt. % to 4 wt. % based on the total weight of the composite.

7. The composite of claim 6 wherein the substrate is sodium persulfate, the ionomer is a neutralized, sulfonated EPDM terpolymer and the ratio of the ionomer to asphalt is 97:3.

8. The composite of claim 7 wherein the asphalt is sulfonated and neutralized.

* * * * *